SWITCHING CONTACTS CONTROLLED BY MAGNETIC FIELDS

Filed June 15, 1960 6 Sheets-Sheet 1

INVENTORS:
Georg Bergsträsser
Hans Hatzinger
by Erwin Sahm
Atty.

SWITCHING CONTACTS CONTROLLED BY MAGNETIC FIELDS

Filed June 15, 1960 6 Sheets-Sheet 2

INVENTORS:
Georg Bergsträsser
Hans Hatzinger
by Erwin Salzer Atty.

Dec. 4, 1962 G. BERGSTRÄSSER ET AL 3,067,304

SWITCHING CONTACTS CONTROLLED BY MAGNETIC FIELDS

Filed June 15, 1960 6 Sheets-Sheet 3

INVENTORS:

Georg Bergsträsser

Hans Hatzinger by Erwin Salzer Atty.

SWITCHING CONTACTS CONTROLLED BY MAGNETIC FIELDS

Filed June 15, 1960 6 Sheets-Sheet 4

INVENTORS:
Georg Bergsträsser
Hans Hatzinger
by Erwin Salzer Atty

Dec. 4, 1962 G. BERGSTRÄSSER ET AL 3,067,304

SWITCHING CONTACTS CONTROLLED BY MAGNETIC FIELDS

Filed June 15, 1960 6 Sheets-Sheet 5

INVENTORS

Georg Bergsträsser

Hans Hatzinger by Erwin Salzer

Atty.

SWITCHING CONTACTS CONTROLLED BY MAGNETIC FIELDS

Filed June 15, 1960 6 Sheets-Sheet 6

INVENTORS:

Georg Bergsträsser

Hans Hatzinger by Erwin Salzer atty.

United States Patent Office 3,067,304
Patented Dec. 4, 1962

3,067,304
SWITCHING CONTACTS CONTROLLED BY MAGNETIC FIELDS

Georg Bergsträsser, Frankfurt am Main Hausen, and Hans Hatzinger, Hechendorf, Pilsensee, Germany, assignors to Telefonbau und Normalzeit G.m.b.H., Frankfurt am Main, Germany Filed June 15, 1960, Ser. No. 36,268
Claims priority, application Germany July 15, 1959
42 Claims. (Cl. 200—87)

This invention relates generally to switching devices, and more particularly to switching devices for relatively small current intensities such as used in communication engineering and certain electronic applications.

As seen from another point of view this invention relates to electromagnetic switching devices, i.e. switching devices wherein relative movement of pairs of cooperating contacts is effected by electromagnetic forces.

Telephone relays comprise generally pairs of leaf springs arranged in registry in parallel planes and adapted to be bent into engagement by electromagnetic operating means. The bulk of such relays is primarily determined by the thickness of the leaf springs and the spacing thereof. These two parameters cannot be reduced beyond certain limits.

It is, therefore, one object of this invention to provide electromagnetic switching devices which lend themselves to be applied as telephone relays, and lend themselves to be also applied in other instances where similar requirements prevail, and which devices involve less bulk, or are more compact, than telephone relays of the aforementioned character.

Another type of prior art electromagnetic relay comprises a pair of current-carrying leaf springs of a magnetizable material arranged in alignment in spaced substantially parallel planes and overlapping at the axially inner ends thereof. When a magnetizing flux is established in said leaf springs their overlapping ends are attracted to and engage each other, and thus close an electric circuit. This type of relay includes generally an envelope of glass into which the leaf springs are sealed. The energizing coil for the leaf springs is generally mounted on the aforementioned glass envelope. This type of electromagnetic relay is also relatively bulky, and calls for magnetic energizing coils which have a relatively large diameter.

It is, therefore, another object of this invention to provide electromagnetic switching devices having substantially the same performance characteristics as the aforementioned prior art switching devices but being substantially more compact than the aforementioned prior art switching devices.

Another object of the invention is to provide switching devices adapted to include a plurality of circuit-making and circuit-breaking points and which involve a minimum of bulk.

Another object of the invention is to provide a modular system of switching devices comprising very compact building-block-like switching units which can readily be assembled into composite switching devices whose bulk is very small.

Still another object of the invention is to provide a switching system of the aforementioned character the constituent switching units of which have different performance characteristics.

Another object of the invention is to provide switching device units the contacts of which are situated substantially in a common plane, and are relatively movable within that plane, thus minimizing the bulk of such device units.

Another object of the invention is to provide compact electromagnetically operated switching device units having a flux path involving but a small leakage flux.

Another object of the invention is to provide compact electromagnetically operated switching device units having switching contacts formed by the contact-operating armature itself.

Still another object of the invention is to provide compact electromagnetically operated switching device units having frictionally engaging self-cleaning contact surfaces.

Further objects and advantages of the invention will become apparent as the following description proceeds, and the features of novelty which characterize the invention will be pointed out with particularity in the claims annexed to, and forming part of, this specification.

For a better understanding of the invention reference may be had to the accompanying drawings wherein.

Figure 3:
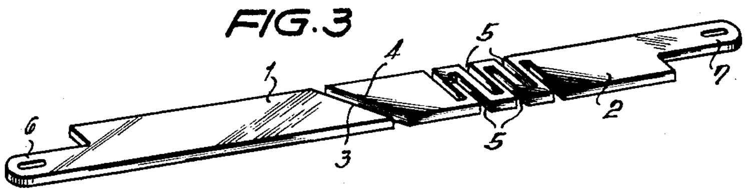
FIG. 3 is an isometric view of the current-carrying elements of a switching device unit embodying this invention shown in open position.
Figure 4:
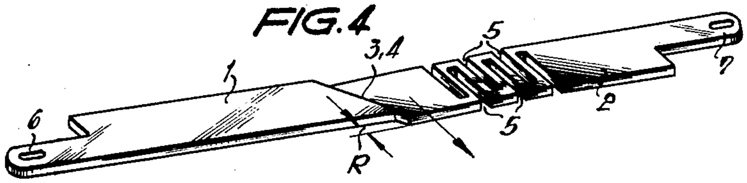
FIG. 4 is an isometric view of the structure of FIG. 3 shown in closed position.
Figure 7:
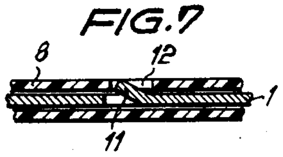
FIG. 7 is a section along VII—VII of FIG. 7*a* and shows a modified detail of what is shown in FIG. 5.
Figure 8:
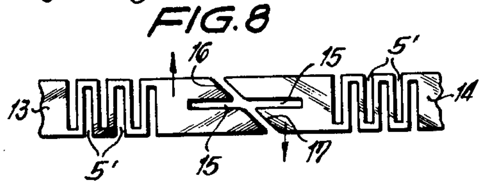
Figures 7A, 9:
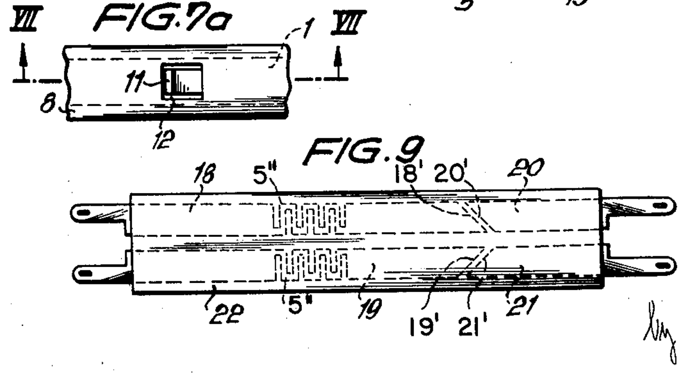
Figure 10:
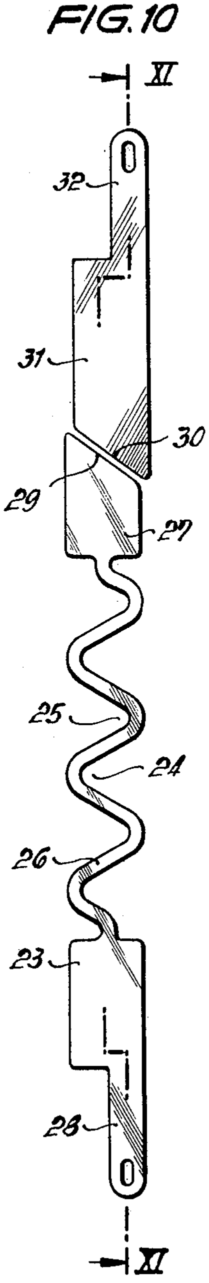
Figure 11:
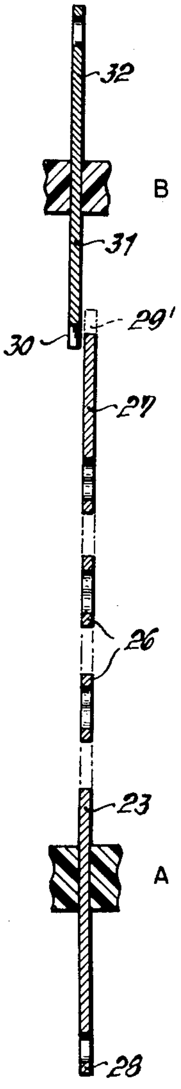
Figure 12:
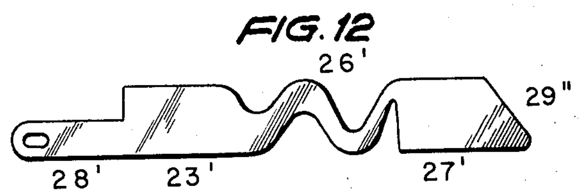
Figure 14:
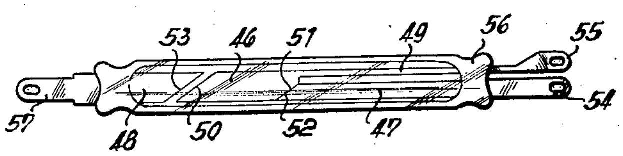
Figure 13:
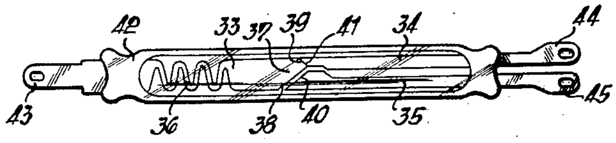
Figure 15:
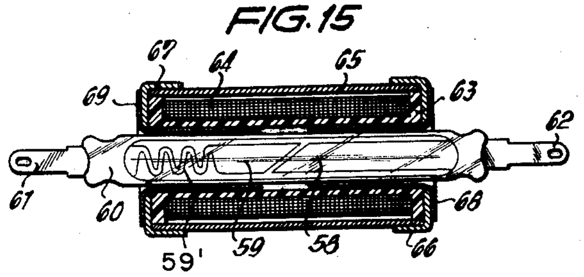
Figure 16:
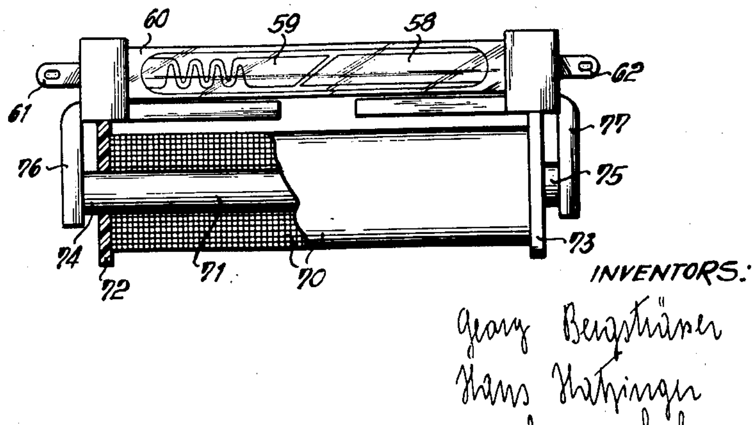
Figures 17, 18, 19, 20, 28, 29, 30:
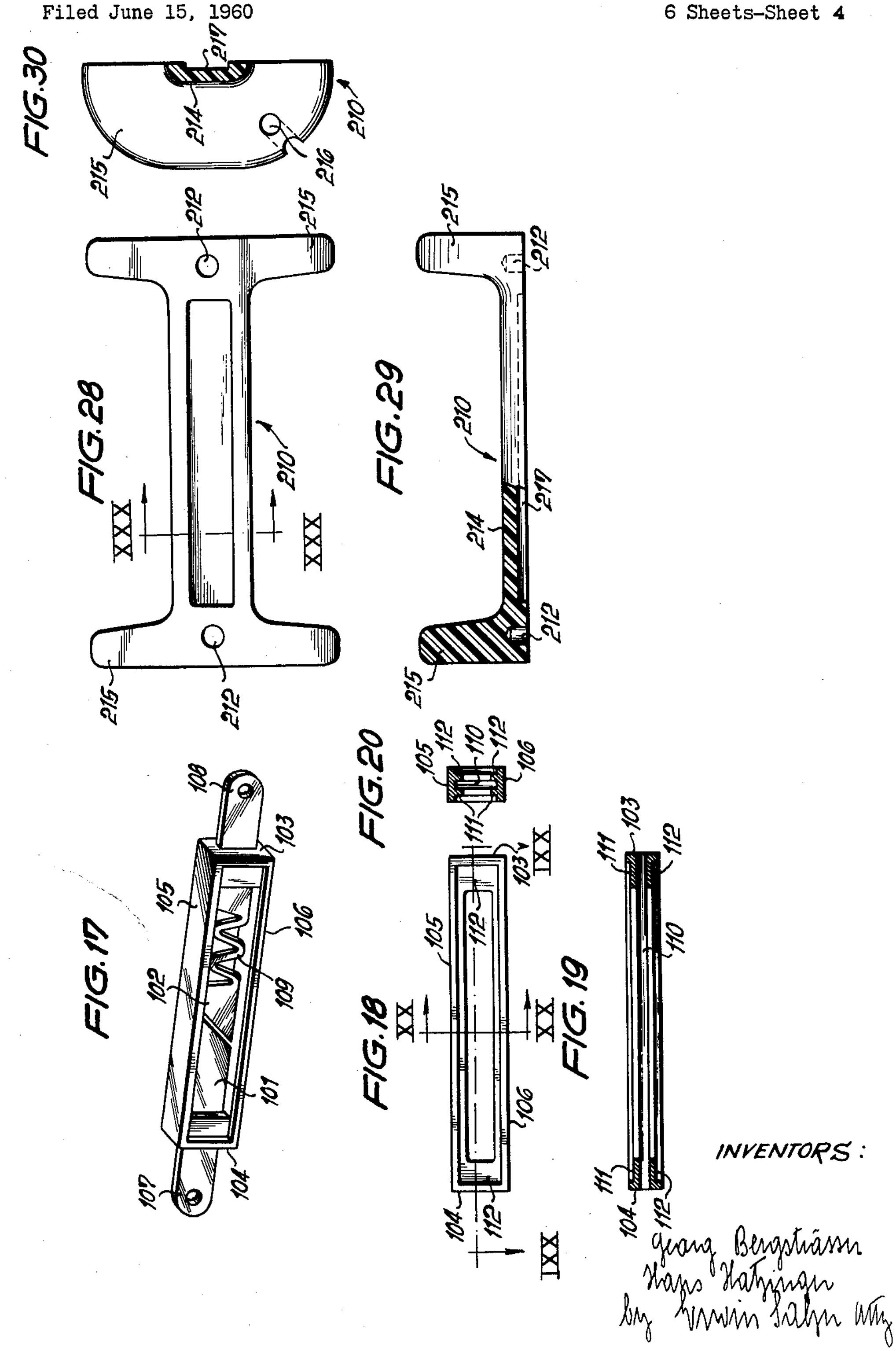
Figure 21:
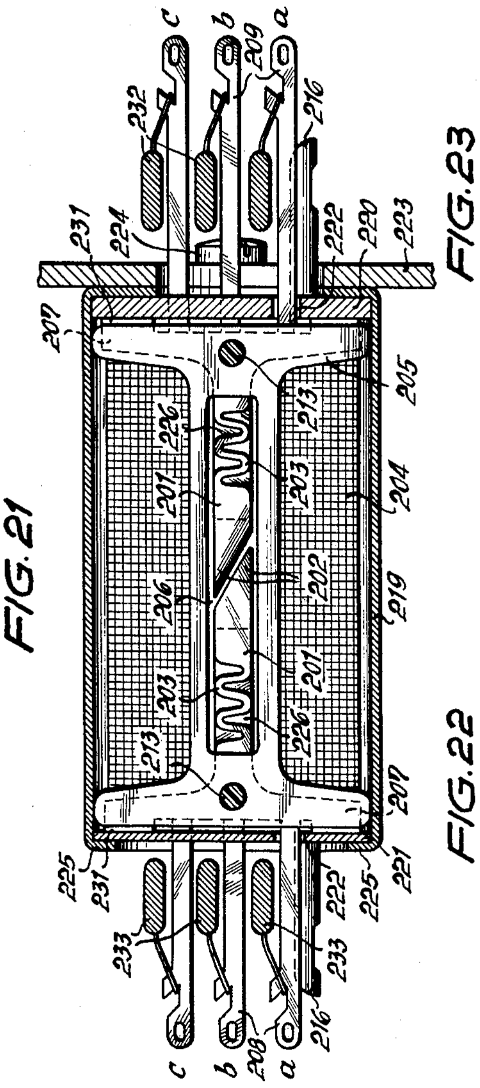
Figure 23:
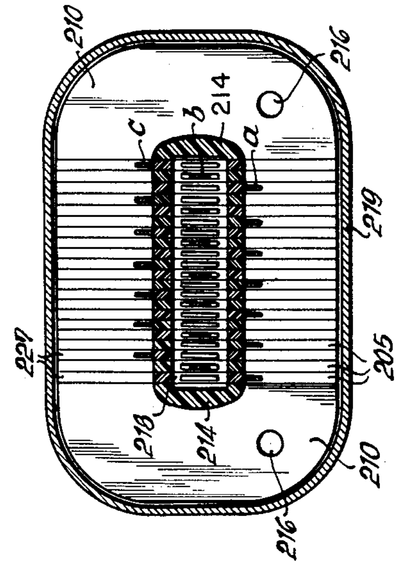
Figure 22:
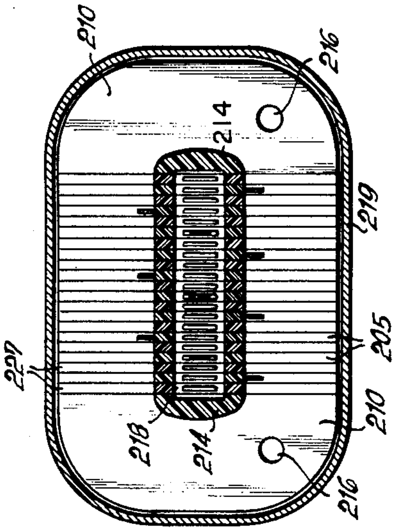
Figures 24, 25, 26, 27:
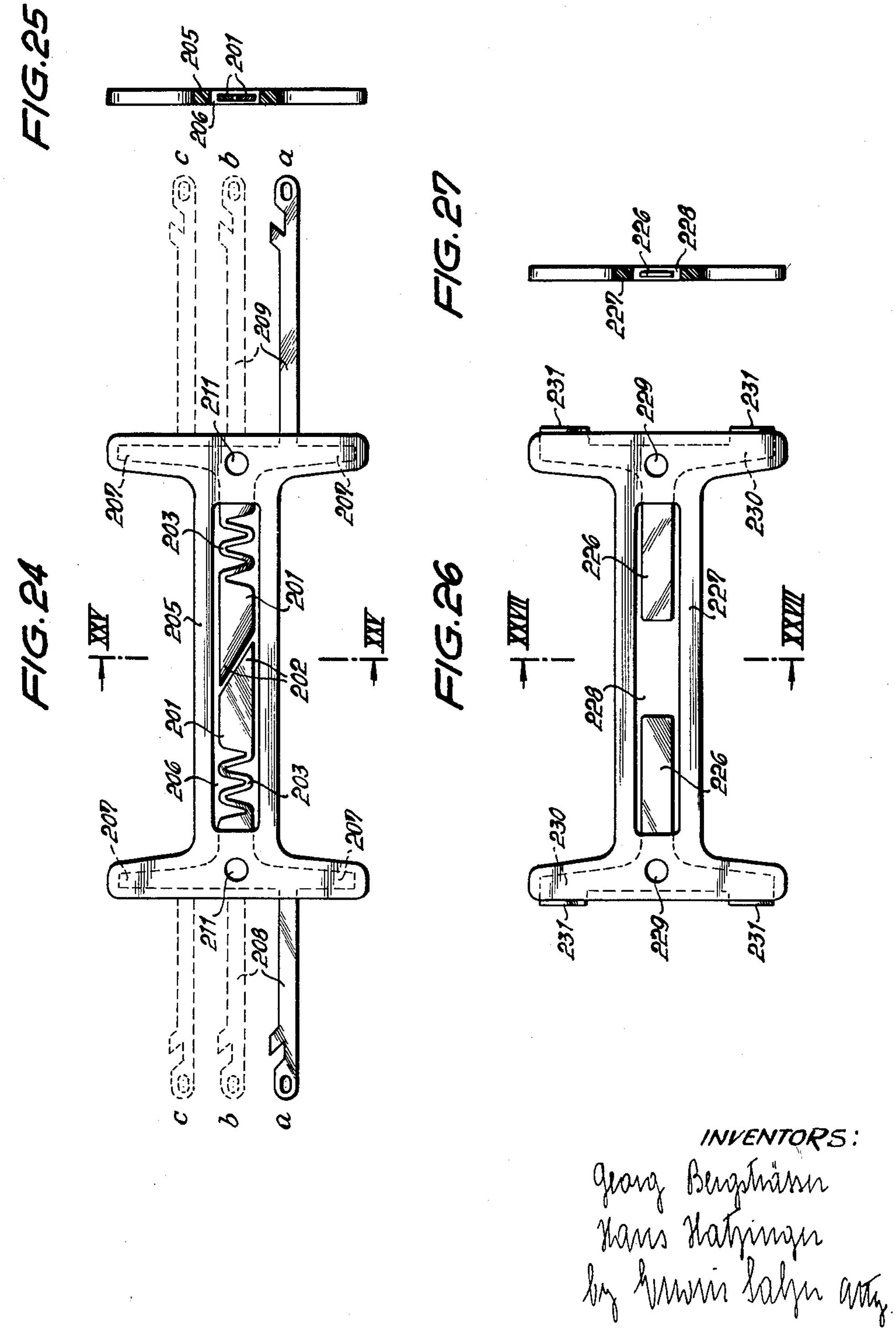

FIG. 7*a* is a top-plan view of the detail shown in FIG. 7;

FIG. 8 is a top-plan view of a modification of the structure of FIGS. 3 and 4 which modification comprises two pairs of contacts establishing parallel current paths when closed;

FIG. 9 is a top-plan view of a switching device unit comprising a pair of fixed contacts and a pair of movable contacts controlling parallel current paths;

FIG. 10 is a top-plan view of a modification of the structure of FIGS. 3 and 4;

FIG. 11 is a section along XI—XI of FIG. 10;

FIG. 12 is a top-plan view of a movable contact spring similar to that shown in the lower portion of FIG. 10;

FIG. 13 is a top-plan view of parts of a change-over switch embodying this invention;

FIG. 14 is a top-plan view of a modification of the parts or subassembly of FIG. 13;

FIG. 15 is partly a longitudinal section and partly a top-plan view of a complete electromagnetic relay embodying this invention;

FIG. 16 is partly a longitudinal section and partly a top-plan view of another complete electromagnetic relay embodying this invention;

FIG. 17 is an isometric view of a pair of cooperating contacts for a switch embodying this invention and of housing or frame means for said pair of contacts;

FIG. 18 is a side elevation of the housing or frame means of FIG. 17;

FIG. 19 is a longitudinal section of the housing or frame means of FIG. 18 taken along IXX—IXX of FIG. 18;

FIG. 20 is a cross-section of the housing or frame structure of FIG. 18 taken along XX—XX of FIG. 18;

FIG. 21 is in part a longitudinal section and in part a top-plan-view of another complete electromagnetic relay embodying this invention;

FIG. 22 is a corss-section of a relay of the type shown in FIG. 21 having 10 contacts upon removal of the energizing coil of the relay;

FIG. 23 is a cross-section of a relay of the type shown in FIG. 21 having 21 contacts upon removal of the energizing coil of the relay;

FIG. 24 is a front elevation of a pair of cooperating contacts and associated parts for a relay of the type shown in FIGS. 21–23;

FIG. 25 is a cross section along XXV—XXV of FIG. 24;

FIG. 26 is a front elevation of an auxiliary stack element for a switch stack of the type shown in FIGS. 21–23;

FIG. 27 is a cross-section along XXVII—XXVII of FIG. 25;

FIG. 28 is a side elevation of the cover for the structure of FIGS. 21–23;

FIG. 29 is partly a section and partly a top-plan view of the structure of FIG. 28; and FIG. 30 is a section along XXX—XXX of FIG. 28.

Figure 1:
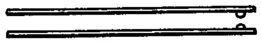
FIG. 1 PRIOR ART
FIGS. 1 and 2 are diagrammatic representations of the aforementioned prior art telephone type relays intended to be improved by the relays embodying this invention.
Figure 2:
FIG. 2 PRIOR ART

The prior art structures of FIGS. 1 and 2 having been described in the introductory clause of this specification, do not call for additional comment.

Referring now to FIGS. 3 and 4 of the drawings, numerals 1 and 2 have been applied to indicate a pair of flat elongated aligned strips, leaf springs or laminations of a magnetizable material. Parts 1 and 2 are preferably stampings. Strips 1 and 2 are current-carrying elements and are arranged in a common plane, i.e. the plane defined by strip 1 as well as by strip 2. Leaf spring 2 comprises a length 5 of reduced cross-sectional area which may be meander-shaped, imparting to the portion of leaf spring 2 situated at opposite ends of length 5 a freedom of relative motion within the plane defined by leaf spring 2. In other words, the portion of leaf spring 2 situated to the left of the meander-shaped length 5 is free to be moved inside the plane defined by leaf spring 2 longitudinally of leaf spring 2 and transversely of leaf spring 2. Such a movement is rendered possible by an elastic deformation of the meander-shaped length 5 of leaf spring 2 formed by lateral incisions in leaf spring 2 staggered on both sides of its longitudinal edges. The cross-sectional area of the meander-shaped length or section 5 of leaf spring 2 is in the order of the square of the thickness of leaf spring 2. The axially outer ends of strips 1, 2 form solder lugs, or connector lugs 6, 7 for connecting strips 1, 2 into an electric circuit. Strips 1, 2 have oblique axially inner edges which are juxtaposed and form contact surfaces 3, 4. FIG. 3 shows the normal or open positions of contact surfaces 3, 4, and FIG. 4 shows the closed positions thereof.

Contact surfaces 3, 4 remain in their normal or open position as long as the structure of FIGS. 3 and 4 is not subjected to the action of a magnetic field as may be produced, for instance, by any electrically energized coil (not shown in FIGS. 3 and 4). If exposed to the action of a magnetic field a flux is produced from strip 1 to strip 2 across the gap formed between strips 1 and 2 and the movable oblique contact surface 4 is attracted toward the fixed oblique contact surface 3. Because of the flexibility or resiliency of reduced cross-section portion 5 of strip 2 contact surface 4 is free to move into engagement with contact surface 3. In so doing contact surface 4 may describe a trajectory including an axial component and a transverse component of which the latter has been indicated by reference character R. Contact surfaces 3, 4 frictionally engage each other and contact surface 4 tends to slide along contact surface 3, thus having a wiping action, or self-cleaning action.

The structure of FIGS. 3 and 4 can readily be adjusted by a slight bending of the meander-shaped length 5 of reduced cross-section. The sensitivity of the present structure depends largely upon the initial width of the gap formed between contact surfaces 3, 4 (FIG. 3). The width of said gap can be readily controlled or adjusted to fit particular requirements by changing the points or areas of support of strips 1 and 2.

Figure 5:
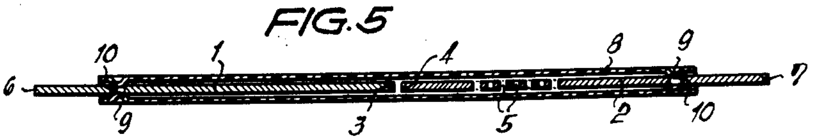
FIG. 5 shows a modification of the structure of FIGS. 3 and 4 and is a section along V—V of FIG. 6.
Figure 6:
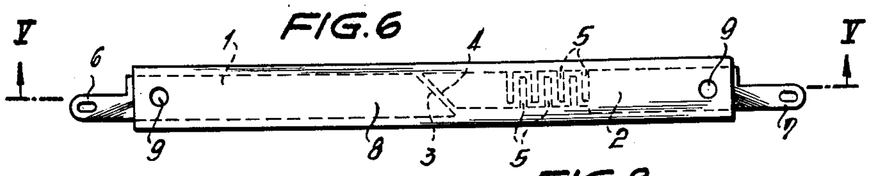
FIG. 6 is a top-plan view of the structure of FIG. 5.

The structure shown in FIGS. 5 and 6 comprises substantially the same arrangement of parts as shown in FIGS. 3 and 4, namely a pair of aligned strips 1, 2 of a magnetizable material arranged in a common plane forming perforated soldering lugs 6, 7 at the axially outer ends thereof and forming a pair of cooperating oblique contact surfaces 3, 4 at the axially inner juxtaposed ends thereof. Contact surface 4 is movable within the plane defined by strips or laminations 1 and 2 by virtue of the meander-shaped length 5 of reduced cross-section. Strips 1 and 2 are sandwiched between a pair of insulating plates, or accommodated in a flat insulating tubing 8 of substantially rectangular cross-section. Such an arrangement may offer complete protection to the relatively sensitive strips or laminations 1, 2 and makes it possible to obtain multi-circuit switching devices by stacking of basic switching units. As shown in FIGS. 5 and 6 each strip or lamination 1, 2 is provided with a perforation 10 adjacent the axially outer end thereof and the top and bottom of insulating tubing 8 is pressed at 9 into perforations 10, thus establishing a mechanical tie between parts 1, 2 and 8. If desired, the axially outer ends of strips or laminations 1, 2 may be secured in a fluid-tight fashion to the inner surface of protective tubing 8, and the latter may be adapted to be evacuated and filled with an inert gas, or a protective gas, or a gas having some desirable characteristics of a predetermined nature.

As shown in FIG. 7 and FIG. 7*a* protective tubing 8 is provided with a rectangular cut-out 12, and leaf spring 1 is provided with an upturned tab 11 projecting into cut-out 12. The best way of securing strips 1 and 2 to a pair of protective plates or a protective tubing depends upon the material of which the protective means are made. They may be made of glass, a synthetic resin, or even of metal. In the last referred-to instance strips 1, 2 must be insulated from the protective strip-enclosing-means.

FIG. 8 shows the axially inner ends of a pair of aligned flat current-carrying strips or laminates 13, 14 of magnetizable material arranged in a common plane. Each of strips 13, 14 comprises a meander-shaped length 5′ of reduced cross-sectional area imparting to the axially inner end and to the axially outer end of each strip 1, 2 a freedom of relative motion in the common plane defined by strips 1, 2. The axially inner oblique edges of strips 13, 14 form contact surfaces 16, 17. Each strip 13, 14 is provided with a slot 15 extending from its respective contact surface 16, 17 in a longitudinal direction. Slots 15 subdivide contact surfaces 13, 14 into two separate parts. Dual contact surfaces of the kind shown in FIG. 8 may also be achieved by slotting but one of strips 13 or 14, instead of slotting both said strips.

The composite structure shown in FIG. 9 comprises two switching units of which each is substantially identical to one of the switching units illustrated in FIGS. 3–6. One of the switching units illustrated in FIG. 9 comprises the aligned strips or laminations 18, 20 and the other the aligned strips or laminations 19, 21. All four strips or laminations 18, 20; 19, 21 are arranged in a common plane and strips or laminations 18, 19 are provided with meander-shaped portions 5″ of reduced cross-sectional area to establish a freedom of motion and flexibility in the plane defined by strips 18, 20 and 19, 21. The axially inner contact-surface-forming edges 18′, 19′ of current-carrying strips 18, 19 are arranged in V-formation and the same applies in regard to the axially inner contact-surface-forming edges 20′, 21′ of current-carrying strips 20, 21. When the axially inner ends 18′, 19′ of strips 18, 19 are magnetically attracted by the axially inner ends 20′, 21′ of strips 20, 21, the former perform a slight transverse movement increasing the spacing between the axially inner contact-surface-forming ends or edges 18′, 19′ of strips 18, 19. This tendency is increased by virtue of the fact that strips or leaf springs 18, 19 are magnetized in the same sense, exerting repulsive forces upon each other. Strips 18, 20 and 19, 21 are enclosed in a common housing 22 which may be formed by a length of flat insulating tubing substantially rectangular in cross-section, as explained more in detail in connection with FIGS. 5 and 6. Strips 18, 19 and strips 20, 21 may be directly connected to each other in which case the structure of FIG. 9 is converted into a means having dual contacts for switching one single circuit somewhat similar to the structure of FIG. 8.

The switching device or part thereof shown in FIGS. 10 and 11 includes a pair of flat aligned current-carrying strips or laminations 23, 31 of a magnetizable material arranged in a common plane. The axially outer ends of strips 23, 31 form soldering lugs or connector lugs 28, 32, whereas the axially inner edges of strips 23, 31 form cooperating oblique contact surfaces 29, 30. Reference numeral 27 has been applied to indicate that portion of spring or strip or lamination 23 situated immediately adjacent the contact-surface-forming edge portion 29. The axially outer end of leaf spring 23 and portion 27 are tied together by the generally sinusoidal portion 26 of reduced cross-sectional area. Portion 26 is formed by substantially trapezoidal incisions 24 to the right and substantially trapezoidal incisions 25 to the left of strip 23 as seen in FIG. 10. The corners of trapezoidal incisions 24, 25 are rounded and incisions 24, 25 on different sides of strip 23 are staggered, thus establishing a zig-zaging or substantially sinusoidal current path of reduced cross-sectional area between the two ends of leaf spring or strip 23. The substantially sinusoidal relatively long portion 26 of leaf spring 23 imparts to part 27 and contact surface 29 not only a freedom of motion within the plane defined by leaf spring 23 but, in addition thereto, also some freedom of motion at right angles to that plane. The importance of this latter feature will be readily apparent from a consideration of FIG. 11 showing strips 23 and 31 as being clamped in or supported at A and B, i.e. strips 23 and 37 are arranged in parallel but slightly different or spaced planes. If a magnetic series flux is passed through strips 23 and 31, contact surfaces 29 and 30 are attracted to each other. If part 27 and contact surface 29 were merely movable in the plane defined by the area of engagement between spring 23 and support A, the axially inner end of spring 23 would assume the position shown in FIG. 11 by dotted lines 29', i.e. surface 29 would overlap, but could not possibly engage, surface 30. The combined flexibility of sinusoidal reduced cross-section portion 26 in the plane defined by the area of engagement between spring 23 and support A as well as at right angles to that plane makes it possible for edge portion 29 to engage edge portion 30 rather than to assume the undesirable position indicated in FIG. 11 by the dotted line 29'.

The current-carrying spring structure 23' shown in FIG. 12 may take the place of spring structure 23 in the arrangement of FIGS. 10 and 11. Spring structure 23' comprises a solder lug 28' at one end thereof and a contact-surface-forming edge 29'' at the opposite end thereof. Trapezoidal spring portion 27' is situated immediately adjacent to contact-surface-forming edge 29''. Spring structure 23' further comprises an intermediate substantially sinusoidal or zig-zaging length 26' of reduced cross-sectional area. The cross-sectional area of spring section 26' is largest at the left end thereof (as seen in FIG. 12), and decreases progressively toward the right, i.e. toward the region where contact-surface-forming edge 29'' is situated. In the arrangement of FIGS. 10 and 11 there is an abrupt change of cross-sectional area at the lower end of spring or lamination 23 at the point of junction between the portion having a relatively large cross-section and the sinusoidal portion 26 having a relatively small cross-section. Upon energization of the operating magnet causing engagement of contact edges 29, 30 the highest bending stress occurs at the aforementioned point of junction or abrupt change of cross-sectional area. This can readily be demonstrated by optical stress analysis. As a result of the aforementioned fact there is a tendency of fatigue or of defect at the aforementioned point of junction or abrupt change of cross-sectional area.

The geometry of FIG. 12 does away with the aforementioned limitation of the geometry of FIGS. 10 and 11, because the change of cross-sectional area occurring therein (from left to right as seen in FIG. 12) is progressive rather than abrupt. It can readily be demonstrated by optical stress analysis that the bending stresses occurring along the edges of sinusoidal portion 26' are substantially equal along the entire length of that portion.

The structure of FIG. 13 comprises three flat metallic elements or strips or laminations 33, 34, 35 of which strips 33 and 35 are made of a magnetizable material. All three strips 33, 34, 35 are arranged in a common plane. Strip or spring 33 comprises a substantially sinusoidal length 36 of reduced cross-sectional area, providing freedom of movement of the right end 37 of spring 33 in the plane defined by spring 33. The right end 37 of spring 33 is V-shaped, forming two edges 38, 39 enclosing an acute angle. The left end of spring 33 is provided with a soldering lug 43. Strips 34, 35 are provided at the axially outer ends thereof with soldering lugs 44 and 45, respectively, and have at their axially inner ends contact-surface-forming edges 41 and 40, respectively, arranged in V-formation. Contact-surface-forming edge 41 is adapted to cooperate wtih contact-surface-forming edge 39. Contact-surface-forming edge 40 is adapted to cooperate with contact-surface-forming edge 38. The three strips 33, 34, 35 are sealed into a glass container 42 which is associated with any desired means (not shown in FIG. 13) for establishing a magnetic field.

As long as that field is not established and no magnetic flux passes through strips 33 and 35 edge 39 engages edge 41 and edge 38 is spaced from edge 40. Hence strips 33 and 34 may carry an electric current, but strip 35 does not carry any electric current. Upon establishing a magnetic field causing the flow of a magnetic flux through strips 33 and 35 edge 38 is attracted toward edge 40 and edge 39 is separated from edge 41. Hence the current path is shifted from strips 33, 34 to strips 33, 35, i.e. this device works in the fashion of a change-over switch.

FIG. 14 shows another device embodying this invention also working in the fashion of a change-over switch. The structure of FIG. 14 comprises three current-carrying metal strips 46, 47 and 48 of which strips 46 and 48 are made of a magnetizable material. Strip 48 is provided with a terminal lug 57, and strips 46 and 47 are each provided with a terminal lug 55 and 54, respectively. The oblique edge 53 of strip 48 forms a contact surface adapted to cooperate with oblique edge 50 of strip 46. Strip 46 is provided with a straight portion 49 of greatly reduced cross-sectional area imparting to edge 50 a freedom of motion within the plane defined by strips 46, 47 and 48. The axially inner portions of strips 46, 47 and 48 are sealed into a transparent envelope 56 from which but lugs 54, 57 and 55 emerge. The device further comprises means for establishing a magnetic control field which means are not shown in FIG. 14.

Normally, i.e. in the absence of a magnetic control field, the current path of the device includes strips 46 and 47 and the contact-surface-forming edges 51 and 52 thereof. When the device is exposed to the action of an appropriate magnetic field a flux is caused to pass through magnetizable strips 48 and 46. As a result, contact-forming edge 50 is attracted toward contact-forming edge 53 and contact-forming edge 51 is separated from contact-forming edge 52. Thus a current-path is established comprising strips 46 and 48 and the current path comprising the strips 46 and 47 is interrupted.

The structures of FIGS. 15 and 16 include electromagnetic means for establishing magnetic control fields and magnetic control fluxes, and all the embodiments of the invention which have been described above, i.e. those shown in FIGS. 3–14, may be provided with the same or similar electromagnetic control means.

Referring now to FIG. 15 the electromagnetic relay shown therein comprises a pair of aligned magnetizable strips or laminations 58, 59 arranged in a common plane. The axially inner oblique or slanting edges of strips 58, 59 form a pair of cooperating relatively movable contact surfaces, whereas the axially outer ends of strips 58, 59 form connector lugs 61, 62. Strip or spring 59 comprises a substantially sinusoidal length 59'' of greatly reduced cross-section, as above described in considerable detail in connection with other embodiments of the invention. Strips 58, 59 are sealed into a glass envelope 60 from which but lugs 61, 62 emerge. Envelope 60 and strips 58, 59 are arranged substantially in coaxial relation inside of a coil 64 intended to establish an electromagnetic control field. Coil 64 is mounted on a support 63 of insulating material and wrapped into a shell or sheet 65 of magnetizable material substantially coextensive with the outer surface thereof. Sheet 65 is held in position by a pair of overlapping fastening rings 66, 67 having an L-shaped cross-section. The device further comprises a pair of elements 68, 69 of a magnetizable material for decreasing the reluctance of the flux path through the device. Each of elements 68, 69 comprises one disc-shaped flange section arranged in abutting relation with one of the fastening rings 66, 67 and a tubular section guiding the magnetic flux to the gap formed between the axially inner ends of strips 58, 59. The flux path of the device is as follows: Outer wrapping 65, right fastening ring 66, right element 68, strip 58, strip 59, left element 69, left fastening ring 67, outer wrapping 65. Upon energization of the relay of FIG. 15 the axially inner edges of strips 58, 59 move into physical engagement and establish a current path through the same.

The electromagnetic relay illustrated in FIG. 16 differs from that illustrated in FIG. 15 in that in the former the longitudinal axes of the contact-forming magnetizable strips 58, 59 are arranged parallel to, and spaced from, the longitudinal axis of energizing or control coil 70. The relays proper shown in FIGS. 15 and 16 are substantially identical, and both include terminal lugs 61, 62 and a transparent envelope 60 which may be filled with a protective or another appropriate gas. The energizing or control coil 70 is mounted upon a core 71 of magnetizable material supported adjacent the ends 74, 75 thereof by a pair of parallel plates 72, 73 of insulating material. A pair of substantially L-shaped or angularly-shaped yoke members 76, 77 of a magnetizable material having a high permeability establish flux paths from the ends 74, 75 of core 71 to points immediately adjacent the axially inner juxtaposed ends of strips 58, 59. The gap formed between the portions of yoke members 76, 77 extending parallel to strips 58, 59 has a higher magnetic reluctance than the shunt path including the axially inner portions of strips 58, 59. Hence the preponderance of the flux established upon energization of coil 70 will flow through the axially inner portions of strips 58, 59 rather than across the gap formed between the aligned portions of L-shaped yoke members 76, 77. As a result, the force of attraction between the axially inner ends of strips 58, 59 will be relatively large.

The switching device shown in FIG. 17 comprises current-carrying means substantially identical to those shown in FIGS. 3 and 4 and described in connection therewith. These means include the two aligned strips or laminations 101, 102 of a magnetizable material arranged in a common plane having oblique axially inner edges forming contact surfaces and having axially outer ends adapted to form soldering or connector lugs 107, 108. Strip or spring 102 includes a substantially sinusoidal portion 109 of reduced cross-section whose purpose or function has been described above in connection with other embodiments of the invention. Strips 101, 102 are associated with, and supported by, a substantially rectangular frame structure of insulating material having a pair of relatively long sides 105, 106 and a pair of relatively short sides 103, 104. The relatively long sides 105, 106 extend parallel to the lateral or longitudinal edges of strips 101, 102, whereas strips 101, 102 project at right angles across the relatively short frame sides 104, 103.

As shown in FIGS. 18–20 the inner surfaces of frame 105, 106; 103, 104 may be grooved as shown at 110 to provide a support for strips 101, 102 (FIG. 17). These strips may be inserted into the aforementioned grooves and are then securely held therein in position. Reference numerals 111 and 112 have been applied to indicate surfaces of frame 105, 106; 103, 104 extending parallel to the plane defined by strips 101, 102 but spaced from that plane. Surfaces 111, 112 are provided to support auxiliary elements intended to impart particular operating characteristic to an electro-magnetic relay of the kind under consideration. It may, for instance, be desirable to provide a magnetic shunt plate parallel to the sinusoidal reduced cross-section portion 109 of strip 102 in order to minimize the reluctance of the magnetic circuit of the relay. Surfaces 111, 112 lend themselves well to the task of supporting a magnetic shunt plate of the aforementioned character for minimizing the reluctance of the magnetic circuit, or achieving high forces of attraction between the axially inner ends of strips 101, 102. In other instances it may be desirable to maintain the juxtaposed contact-surface-forming edges of strips 101, 102 in their engaged position upon initial engagement thereof. This can be achieved by arranging a plate of magnetizable material having a predetermined degree of remanent magnetism parallel to plane defined by strips 101, 102 immediately adjacent to the spaced inner ends thereof. If the material of which such plates are made is properly selected, the remanent magnetism of such a plate may maintain the axially inner end of strip 102 in its closed position, once it has been moved to that position by magnetic attraction between the axially inner ends of strips 101, 102. Surfaces 111, 112 lend themselves well to the task of supporting such magnetic remanence plates for maintaining contact surfaces in the closed position thereof. Surfaces 111, 112 may also be use for supporting elements having a predetermined electric resistance which elements may be used for controlling the time of build-up, or time of decay, of the magnetic control field of an electromagnetic relay of the kind under consideration, thus controlling its speed of response.

Relays or relay units of the type shown in FIGS. 17–20 are intended to be stacked to form composite multi-contact switching devices. Stacking is effected by superimposing relay units as shown in FIG. 17 in such a way that the strips 101, 102 of all the stacked units are situated in parallel spaced planes and that the short sides 103, 104 of all the stacked units are situated in a pair of parallel spaced planes. Relay units or switching units such as that shown in FIG. 17 may—upon being stacked—be held together by any appropriate fastener means as, for instance, glueing. When such units are stacked their frame structures 105, 106; 103, 104 form a tunnel-shaped enclosure defining internally a unitary switching chamber. The two openings at the ends of such a tunnel-shaped enclosure may be closed by appropriate cover means. The magnetizable strips 101, 102 inside the enclosure may be magnetized or energized by a common energizing coil mounted upon, and supported by, the enclosure. This will be described below more in detail in connection with FIGS. 21 and 24.

Referring now to FIGS. 21 and 24, numeral 201 has been applied to indicate a pair of aligned current carrying leaf springs of a magnetizable material arranged in a common plane. Each leaf spring 201 is provided with a substantially sinusoidal or zig-zaging portion 203 of reduced cross-sectional area. If an electric current energizes coil 204 the axially inner oblique ends 202 of springs 201 attract each other and thus close an electric circuit. Upon de-energization of coil 204 the axially inner ends 202 of springs 201 part instantly due to the spring action inherent in the reduced cross-section portions 226. As can best be seen in FIGS. 24 and 25 each of springs 201 is substantially T-shaped and thus comprises a web portion and a flange portion 207. The web portions of springs 201 are aligned and the flange portions 207 thereof are parallel. Flange portions 207 serve the dual purpose of reducing the magnetic reluctance of the relay structure and of increasing its dimensional stability. Flange portions 207 are laminated into a substantially I-shaped spring support 205 of insulating material having a web portion and two flange portions. The latter are substantially co-extensive with the flange portions of springs or laminations 201. The web portion of spring-support 205 is provided with a substantially rectangular cut-out 206 forming a switching chamber and affording free movement for the aligned web portions of springs 201. Each spring 201 is provided at the axially outer side thereof with a soldering lug or connecter lug such as lugs *a*, *b*, *c*. If switching units as shown in FIG. 24 are stacked the lugs pertaining to superimposed switching units must be staggered so as to facilitate forming solder connections with external parts of the circuits controlled by the composite relay structure. In FIG. 24 reference character *a* has been applied to indicate the two terminal lugs of a relay unit supposed to be arranged on the top of a stack of such units, where as reference characters *b* and *c* have been applied to indicate the respective positions of lugs shown by dotted lines pertaining to units supposed to be situated at lower levels of the stack.

FIG. 21 illustrates a composite switching device comprising stacked switching units of the type singly shown in FIG. 24. If switching units of the type singly shown in FIG. 24 are stacked in registry, the registering cut-outs 206 thereof define a tunnel-shaped space which may be closed by appropriate cover structures such as those shown in FIGS. 28–30 which will be considered below more in detail.

T-shaped springs 201 and I-shaped spring-supports 205 are provided with circular registering perforations 211 receiving registering rods 213 of insulating material. Similarly cover structures 210 (see FIGS. 28–30) are provided with recesses 212 arranged in registery with perforations 211 and receiving the ends of registering rods 213 which project out of the stack switching units proper into the cover structures 210 thereof. If desired the individual switching units may be held together by additional means such as, for instance, glueing.

The two substantially I-shaped insulating covers 210 shown in FIGS. 28–30 each have a rectangular internal recess 217 positioned in such a way as to register with the rectangular cut-outs 206 of I-shaped spring supports 205 of insulating material. Each cover 210 is provided with a flange 215 projecting at right angles from the general plane 214 of the cover. Flanges 215 define insulating ducts or bushings 216 (see FIGS. 22, 23 and 30) for the passage of the terminals 216′ of energizing coil 204 (see FIG. 21). The stack of switching units and the cover structures 210 on both ends thereof form jointly a coil support for coil 204, the relatively long soldering lugs *a*, *b*, *c* projecting in opposite directions axially outwardly from this composite structure as can best be seen in FIG. 21. Coil 204 is wound upon the stack formed of switching units and of cover structures 210 upon complete assembly thereof. Thereupon the stack of switching units, cover structures 210 and coil 201 are inserted into an enclosure, shell or wrapping 219 made of a magnetizable material and forming a portion of the flux path of the relay and protecting the relay against the action of the external magnetic fields or stray fields. Enclosure, shell or wrapping 219 is closed by end plates 220, 221 of a magnetizable material forming other portions of the flux path of the relay. Both end plates 220, 221 are provided with slots or perforations 222 for the passage of connector lugs *a*, *b*, *c*. End plate 220 is provided with screw-threaded holes (not shown), adapted to secure the same by means of screws 224 to a rail 223, or equivalent supporting structure, as clearly shown in FIG. 21. As shown in the same figure, the left or rear end of enclosure or wrapping 219 forms a narrow annular flange 225 supporting the bottom end plate 221, and the front end plate 220 is engaged by an overlapping annular flange formed by the right or front end of enclosure or wrapping 219. Hence parts 219, 220 and 221 and the stack-assembly housed therein form a self-sustained structural unit.

In FIG. 21 numerals 232 have been applied to indicate input conductors and reference numerals 233 to indicate output conductors both extending at right angles to the plane of the paper.

The structure of FIG. 21 is, in effect, an electromagnetically operated system of Cartesian coordinates. Such a system includes input conductors and output conductors crossing at right angles and electromagnetic means for conductively connecting each of the input conductors with a corresponding output conductor. As mentioned above, input conductors 232 conductively connected to terminal lugs *a*, *b*, *c* on the right side of the relay are arranged at right angles to the plane of the paper. The output conductors must, therefore, be arranged in a plane parallel to the plane of the paper. Each output conductor includes a loop having a portion which is at right angles to the plane of the paper, and it is this portion whose cross-section is illustrated in FIG. 21 and to which numeral 233 has been applied. As shown in that figure each of the left terminal lugs *a*, *b*, *c* is conductively connected to one of the conductors 233.

Reference numeral 216′ in FIG. 21 has been applied to indicate a solder terminal projecting through openings 216 for connecting the energizing coil 204 into an electric circuit.

It is apparent from FIGS. 22 and 23 that the stacked I-shaped spring-supports define jointly a tunnel-shaped switching chamber 218 closed on both ends by cover structures 210. The stacks illustrated in FIGS. 22 and 23 comprise, in addition to spring-supports 205, stack elements 227, one of which is on a larger scale shown in FIGS. 26 and 27.

Referring now to FIGS. 26 and 27, numeral 226 has been applied to indicate a pair of substantially T-shaped laminations of a magnetizable material. Both laminations 226 are arranged in a common plane with the web portions thereof in alignment and the flange portions 230 thereof arranged in parallel relation. The axially inner ends of laminations 226 are spaced, i. e. they form an air gap therebetween. The laminations 226 are laminated into an I-shaped support 227 of insulating material, i.e. the flange portions 230 of laminations 226 are sandwiched between an upper layer and a lower layer of insulating support 227. Support 227 has the same outline as spring-supports 205 shown in FIGS. 24 and 25, and the former is provided with a cut-out 228 and with perforations 229 having the same geometry as cut-outs 206 of spring-supports 205 and perforations 211 of spring supports 205. When supports 205 and 227 are stacked, the perforations 211 and 229 and the rectangular cut-outs 206 and 229 are arranged in registry. Thus insulating rods 213 (FIG. 21) may be used to align supports 205 and 227. Numeral 231 has been applied to indicate short axial extensions of the flanges 230 of T-shaped laminations 226 projecting axially outwardly beyond the edges of I-shaped support 221 into—or almost into—engagement with end plates 220, 221 (FIG. 21). The aligned web portions of laminations 226 form magnetic shunts by-passing the reduced cross-section portions 203 of contact springs 201 and thus greatly reducing the reluctance of the magnetic circuit. This is of particular importance in all applications wherein the operating time of electromagnetic relays is desired to be as short as possible, e.g. in many electronic applications.

While, in accordance with the patent statutes, we have disclosed the specific details of several embodiments of the invention, it is to be understood that these details are merely illustrative and that many variations thereof may be made without departing from the spirit and scope of the invention. It is our desire, therefore, that the language of the accompanying claims be interpreted as broadly as possible, and that it be limited only by the prior state of the art.

We claim as our invention:

1. An electric switching device comprising in combination a pair of flat current-carrying strips of a magnetizable material arranged substantially in a common plane each forming at an edge portion thereof one of a pair of juxtaposed normally spaced cooperating contact surfaces, at least one of said pair of strips including portions adapted to be moved in said common plane relative to each other, one of said pair of contact surfaces forming an integral part of one of said portions; and means for causing relative movement of said pair of contact surfaces, in said common plane and engagement of said pair of contact surfaces, said means including means for establishing a magnetic flux through said pair of strips and across said pair of contact surfaces.

2. An electric switching device comprising in combination a flat current-carrying leaf spring of a magnetizable material including a length of reduced cross-sectional area imparting to portions of said leaf spring a freedom of relative motion within the plane defined by said leaf spring, a flat current carrying element of a magnetizable material arranged substantially in said plane; a pair of cooperating normally spaced contact surfaces formed by edges of said leaf spring and of said element, and means for causing relative motion of said portions of said leaf spring in said common plane and consequent engagement of said pair of contact surfaces, said means including magnetic means for establishing a magnetic flux through said leaf spring across said pair of contact surfaces.

3. An electric switching device as specified in claim 2 comprising a magnetic shunt having a smaller magnetic reluctance than said length of reduced cross-sectional area and shunting said length of reduced cross-sectional area to reduce the aggregate reluctance of the path of said flux.

4. An electric switching device as specified in claim 2 comprising plate means of a magnetizable material arranged adjacent said pair of contact surfaces in a plane parallel to the plane defined by said leaf spring, said plate means having a sufficiently high magnetic remanence to cause said pair of contact surfaces to be maintained in the engaged position thereof once said pair of contact surfaces have been moved by the action of said magnetic flux into said engaged position.

5. An electric switching device comprising in combination a pair of spaced current-carrying laminations of a magnetizable material arranged substantially in a common plane, one of said pair of laminations including a length of reduced cross-sectional area imparting to portions thereof a freedom of relative motion within said common plane, a pair of cooperating normally spaced contact surfaces formed by edges of said pair of laminations, an envelope sealing-in juxtaposed ends of said pair of laminations including said contact-surface-forming edges, and a magnet structure including an energizing coil arranged outside of said envelope and adapted to establish a magnetic flux through said pair of laminations and across said contact-surface-forming edges to cause engagement of said edges.

6. An electric switching device comprising in combination a pair of aligned current-carrying strips of a magnetizable material each having a pair of normally spaced edges disposed obliquely with respect to the longitudinal axis thereof, means arranged remote from said pair of edges for fixedly supporting each of said pair of strips substantially in a common plane, means for imparting to one of said pair of edges a freedom of motion in said common plane, said means including a reduced cross-section portion on one of said pair of strips, and means for causing relative motion of said pair of edges in said common plane in the direction of said longitudinal axis, said means including means for establishing a magnetic flux through said pair of strips and across said pair of edges.

7. An electric switching device comprising in combination a pair of substantially flat plates of insulating material, a pair of laminations of a magnetizable material sandwiched in part between said pair of plates and having a pair of normally spaced juxtaposed edges, means for imparting to one of said pair of edges a freedom of motion parallel to the planes defined by said pair of plates, said means including a length of reduced cross-sectional area on one of said pair of laminations, and means for establishing a magnetic flux through said pair of laminations and across said pair of edges to cause engagement thereof by magnetic action.

8. An electric switching device as specified in claim 7 wherein said pair of plates defines a free space in the region of engagement between said pair of edges adapted to preclude frictional engagement of said pair of edges by said pair of plates.

9. An electric switching device comprising in combination a first flat elongated current-carrying leaf spring of a magnetizable material including a length of reduced cross-sectional area imparting to portions of said first leaf spring a freedom of relative motion within the plane defined by said first leaf spring, a second flat elongated current-carrying leaf spring of a magnetizable material arranged substantially in the plane defined by said first leaf spring, said second leaf spring including a length of reduced cross-sectional area imparting to portions of said second leaf spring a freedom of relative motion within said plane defined by said second leaf spring, a pair of movable contact surfaces one formed by an edge on said first leaf spring and the other formed by an edge on said second leaf spring, a pair of fixed contact surfaces of a magnetizable material each arranged to cooperate with one of said pair of movable contact surfaces, and magnetic means for establishing a pair of parallel magnetic fluxes, one through said first leaf spring and through one of said pair of fixed contact surfaces and the other through said second leaf spring and through the other of said pair of fixed contact surfaces.

10. An electric switching device as specified in claim 9 wherein said pair of movable contact surfaces are arranged in V-formation, wherein said pair of fixed contact surfaces are arranged in V-formation, and wherein each of said pair of fixed contact surfaces is formed by an edge of a lamination of a magnetizable material.

11. An electric switching device comprising in combination a flat current-carrying strip of a magnetizable material including a length of reduced cross-sectional area imparting to portions of said strip a freedom of relative motion within the plane defined by said strip, a movable contact surface formed by an edge of said strip, a fixed contact surface normally engaged by said movable contact surface, a lamination of a magnetizable material arranged in said plane defined by said strip in spaced relation from said fixed contact surface, and magnetic means for establishing a magnetic flux through said strip and said lamination to cause disengagement of said movable contact surface from said fixed contact surface and movement of said movable contact surface to said lamination.

12. An electric switching device comprising in combination a first flat current-carrying strip of magnetizable material having an edge forming a first contact surface, a second flat current-carrying strip arranged substantially in the plane defined by said first strip and having an edge forming a second contact surface, a third flat current-carrying strip of magnetizable material arranged substantially in said plane defined by said first strip and including a length of reduced cross-sectional area imparting a freedom of relative motion in said plane defined by said first strip to portions of said third strip, said third strip further including a pair of edges forming a pair of contact surfaces, one of said pair of contact surfaces being normally spaced from said first contact surface and the other of said pair of contact surfaces normally engaging said second contact surface, and magnetic means for establishing a flux through said first strip, said first contact surface, one of said pair of contact surfaces and said third strip to cause engagement between said first contact surface and said one of said pair of contact surfaces and disengagement of said other of said pair of contact surfaces from said second contact surface.

13. An electric switching device comprising in combination a pair of flat current-carrying leaf springs of magnetizable material aligned in a common plane each having on the axially inner end thereof one of a pair of juxtaposed cooperating normally separated contact surfaces, each of said pair of leaf springs having means including points of reduced cross-sectional area imparting to said pair of contact surfaces a freedom of motion in said common plane, and means for causing relative motion of said pair of contact surfaces in said common plane, said means including means for establishing a magnetic flux through said pair of leaf springs causing engagement of said pair of contact surfaces.

14. An electric switching device comprising in combination a pair of current-carrying elongated strips of a magnetizable material aligned substantially in a common plane each having one of a pair of cooperating contact-surface-forming edges, at least one of said pair of strips having a longitudinal slot subdividing one of said pair of contact-surface-forming edges into two sections, at least one of said pair of strips including a length of reduced cross-sectional area imparting to one of said pair of contact-surface-forming edges a freedom of motion within said common plane, and magnetic means for establishing a magnetic flux through said pair of strips and through said pair of contact-surface-forming edges to cause engagement of said pair of contact-surface-forming edges.

15. A switching device as specified in claim 14 wherein said pair of contact-surface-forming edges are arranged obliquely in respect to the longitudinal axes of said pair of strips.

16. An electric switching device comprising in combination a pair of flat current-carrying strips of a magnetizable material arranged substantially in a common plane and forming on adjacent ends thereof a pair of cooperating normally spaced contact surfaces, at least one of said pair of strips having a plurality of lateral incisions arranged in staggered relation on opposite sides of said one of said pair of strips to impart a freedom of relative motion within said common plane to parts of said one of said pair of strips, and means for causing relative motion of said pair of contact surfaces in said common plane, said means including magnetic means for establishing a magnetic flux through said pair of strips and said pair of contact surfaces to cause magnetic attraction of said pair of contact surfaces and engagement thereof.

17. An electric switching device as specified in claim 16 wherein said plurality of incisions are shaped substantially trapezoidally and have rounded edges.

18. An electric switching device comprising in combination a pair of flat current-carrying strips of a magnetizable material aligned substantially in a common plane each forming on the axially inner end thereof one of a pair of juxtaposed cooperating normally spaced contact surfaces, at least one of said pair of strips including a generally meander-shaped portion of reduced cross-sectional area situated between the axially inner end and the axially outer end thereof, and means for causing relative motion of said pair of contact surfaces in said common plane, said means including magnetic means for establishing a magnetic flux through said pair of strips and said pair of contact surfaces causing deformation of said meander-shaped portion and engagement of said pair of contact surfaces.

19. An electric switching device as specified in claim 18 wherein said pair of strips have a predetermined thickness and wherein the width of said meander-shaped portion is of the same order as said thickness.

20. An electric switching device comprising in combination a pair of flat current-carrying strips of a magnetizable material aligned substantially in a common plane, each of said pair of strips forming on the axially inner end thereof one of a pair of juxtaposed cooperating contact surfaces and each of said pair of strips forming on the axially outer end thereof one of a pair of lug means, at least one of a pair of springs including a generally sinusoidal portion of reduced cross-sectional area situated between the axially iner end thereof and the axially outer end thereof; and means for causing expansion of said sinusoidal portion in said common plane, said means including magnetic means for establishing a magnetic flux through said pair of strips and said pair of contact surfaces whereby said pair of contact surfaces are brought into engagement.

21. An electric switching device comprising in combination a pair of flat current-carrying strips of a magnetizable material aligned substantially in a common plane, each of said pair of strips having on the axially inner end thereof one of a pair of juxtaposed cooperating normally separated contact surfaces and each of said pair of strips having on the axially outer end thereof one of a pair of lug means, at least one of said pair of strips including a generally sinusoidal portion situated between the axially inner end thereof and the axially outer end thereof, the cross-sectional area of said entire sinusoidal portion being less than the cross-sectional area of said axially inner end and less than the cross-sectional area of said axially outer end, and the cross-sectional area of said sinusoidal portion progressively decreasing from said axially outer end to said axially inner end; and magnetic means for establishing a magnetic flux through said pair of strips and through said pair of contact surfaces causing deformation of said sinusoidal portion and engagement of said pair of contact surfaces.

22. An electric switching device comprising in combination a pair of flat current-carrying strips of a magnetizable material aligned substantially in a common plane, each of said pair of strips having on the axially inner end thereof one of a pair of juxtaposed cooperating oblique contact surfaces, each of said pair of strips further having means including points of reduced cross-sectional area imparting to each of said pair of contact surfaces a freedom of motion within said common plane, and magnetic means for establishing a magnetic flux through said pair of strips and through said pair of contact surfaces causing deformation of said pair of strips and engagement of said pair of contact surfaces.

23. An electric switching device comprising in combination a pair of flat current-carrying strips of magnetizable material aligned along a common axis and arranged substantially in a common plane each forming a contact surface at juxtaposed edges thereof, at least one of said pair of strips including reduced cross-section means imparting to said one of said pair of strips flexibility within said common plane, and means for causing said pair of contact surfaces to move within said common plane to cause engagement of said juxtaposed edges of said pair of strips, said last mentioned means including a magnetic energizing coil mounted upon said pair of strips to establish a magnetic flux through said pair of strips.

24. An electric switching device as specified in claim 23 comprising additional means of magnetic material arranged in the magnetic circuit of said coil to limit the reluctance thereof, said additional means including a shell wrapped around the outer surface of said coil and magnetic yoke elements substantially co-extensive with a portion of the inner surface of said coil.

25. An electric switching device comprising in combination a pair of flat current-carrying strips of a magnetizable material aligned along a common axis and arranged substantially in a common plane each forming a contact surface at juxtaposed edges thereof, at least one of said pair of strips including reduced cross-section means imparting to said one of said pair of strips flexibility within said common plane, a magnetic energizing coil having a longitudinal axis arranged in spaced relation from and parallel to said common axis, magnetic core means inside said coil, and a pair of substantially L-shaped elements of a magnetizable material establishing a flux path from the ends of said core means to said pair of strips, each of said pair of elements having one arm arranged parallel and another arm arranged at right angles to said common axis.

26. An electric switching device comprising in combination a plurality of flat substantially rectangular frame structures of insulating material each having a pair of relatively long sides and each having a pair of relatively short sides, said plurality of frame structures being stacked in registry and jointly defining a substantially tunnel-shaped space; each of said plurality of frame structures including a pair of current-carrying laminations of a magnetizable material arranged substantially in a common plane defined by one of said plurality of frame structures, each of said pair of laminations forming contact surfaces at adjacent ends thereof and forming lug means at remote ends thereof, said remote ends projecting through said pair of relatively short sides of each of said plurality of frame structures, and at least one of said pair of laminations of each of said plurality of frame structures including reduced cross-section means imparting to said one of said pair of laminations flexibility within said common plane; and joint magnetic means for establishing a magnetic flux through said pair of laminations of each of said plurality of frame structures.

27. An electric switching device as specified in claim 26 comprising a pair of cover means closing said tunnel-shaped space adjacent to the first and adjacent to the last of said plurality of stacked frame structures.

28. An electric switching device comprising in combination a pair of flat substantially T-shaped current-carrying elements of a magnetizable material arranged substantially within a common plane with the web portions thereof in alignment and the flange portions thereof in parallel relation; said web portions forming a pair of cooperating contact surfaces at juxtaposed edges thereof, at least one of said web portions including reduced cross-section means imparting to said one of said web portions flexibilty in said common plane; plate means of insulating material sandwiching said pair of elements and defining a switching chamber coaxial with said web portions and housing said web portions; and a magnet system having pole elements associated with said flange portions for establishing a magnetic flux through said flange portions, said web portions and said contact surfaces thereof.

29. A switching device as specified in claim 28 comprising a pair of connector lugs each extending axially outwardly from one of said flange portions substantially parallel to said web portions.

30. An electric switching device comprising in combination a plurality of pairs of flat substantially T-shaped current-carrying elements of a magnetizable material, said plurality of pairs of elements being stacked in registry and spaced from each other; the constituent elements of each of said pairs being arranged in a common plane with the web portions thereof in alignment and the flange portions thereof in parallel relation, juxtaposed edges of said web portions forming cooperating contact surfaces, and at least one of the web portions of each of said pairs of elements including restricted cross-section means for imparting to said one of said web portions flexibility within said common plane; substantially I-shaped plate means of insulating material interposed as spacers between superimposed pairs of elements; and an energizing coil wound around said web portions of said plurality of pairs of elements and the web portions of said plate means to establish a plurality of magnetic fluxes, one through each of said plurality of pairs of elements.

31. An electric switching device as specified in claim 30 comprising a shell of magnetizable material housing said plurality of pairs of elements and said energizing coil, and further comprising a pair of end plates of magnetizable material arranged at right angles to said web portions of said plurality of elements and providing paths of small reluctance between said shell and said flange portions of said plurality of pairs of elements.

32. An electric switching device as specified in claim 30 comprising a plurality of connector lugs extending axially outwardly in a direction longitudinally of said web portions of said plurality of pairs of elements each from one of said flange portions thereof, a pair of spaced end plates of magnetizable material arranged at right angles to said connector lugs and having a plurality of apertures for the passage of said plurality of connector lugs, and a shell of magnetizable material housing said plurality of elements and said energizing coil and forming a path of small reluctance between said pair of end plates.

33. An electric switching device as specified in claim 30 wherein said plurality of pairs of elements and said plate means are provided with registering perforations and wherein insulating rods are inserted into said perforations to maintain said plurality of pairs of elements and said plate means in position.

34. An electric switching device comprising in combination a stack of registering plate means of insulating material, said stack including a first kind of plate means supporting switching units and said stack further including a second kind of plate means supporting means for controlling operating characteristics of said switching units, said first kind of plate means alternating with said second kind of plate means; each of said first kind of plate means supporting a flat current-carrying strip of a magnetizable material including a length of reduced cross-sectional area imparting to portions of said strip a freedom of relative motion within the plane defined by said strip, each of said first kind of plates further supporting a current-carrying lamination of a magnetizable material arranged substantially in said plane, a pair of cooperating normally spaced contact surfaces being formed by juxtaposed edges of each said strip and each said lamination; and magnetic means for establishing a magnetic flux through each said strip across each said pair of contact surfaces and through each said lamination to cause engagement of each said pair of contact surfaces.

35. An electric switching device comprising in combination a plurality of pairs of current-carrying laminations of a magnetizable material, each pair of laminations being arranged in a common plane and said plurality of pairs being stacked in registry and spaced from each other; each of said pairs of laminations forming at adjacent ends thereof a pair of cooperating normally spaced contact surfaces, at least one of each of said pairs of laminations including a length of reduced cross-sectional area to impart to portions thereof a freedom of motion within said common plane, each of said pairs of laminations forming at remote ends thereof a pair of connector lugs, and pairs of laminations arranged in different planes having pairs of lugs arranged in staggered relation; insulating plate means interposed between said pairs of laminations to maintain the spacing thereof, said plate means defining an open space adjacent each said pair of cooperating contact surfaces to allow free relative movement thereof; and a magnet structure including an energizing coil for establishing magnetic fluxes through said plurality of pairs of laminations causing engagement of said pair of cooperating contact surfaces on each of said plurality of pairs of laminations.

36. An electromagnetic switching device as specified in claim 35 comprising additional plate means of insulating material interposed between contiguous pairs of laminations to increase the spacing of said pair of connector lugs on pairs of laminations disposed in different planes.

37. An electromagnetic switching device as specified in claim 35 comprising a pair of insulating plates each having a pair of flange portions projecting at right angles from the general plane of each of said pair of plates, one of said pair of plates being stacked at the top and the other of said plates being stacked at the bottom of said plurality of pairs of laminations, and said energizing coil being held in position by said pair of flange portions on each of said pair of plates.

38. An electric switching device as specified in claim 2 wherein the material of said leaf spring and the material of said element have sufficient remanent magnetism to maintain said pair of contact surfaces in engagement upon cessation of said magnetic flux.

39. An electric switching device comprising a pair of spaced flat current-carrying strips arranged in a common plane, said pair of strips having a pair of normally spaced juxtaposed edges adapted to form cooperating contact surfaces when cooperatively engaging, at least one of said pair of strips being made of a magnetizable material, said one of said pair of strips including a region of sufficiently reduced cross-section and sufficient length to allow relative motion within said common plane of the portions of said one of said pair of strips situated to opposite sides of said region of reduced cross-section, and means for causing said portions of said one of said pair of strips to move within said common plane relative to each other and to thereby effect a cooperative engagement of said juxtaposed edges, said last mentioned means including means for establishing a strip-operating magnetic flux through said one of said pair of strips.

40. An electric switching device comprising in combination a pair of aligned flat current carrying strips arranged in a common plane, said pair of strips being made of a magnetizable material and having normally spaced edges at the juxtaposed ends thereof defining a gap therebetween, one of said pair of strips having a region of reduced cross-section adapting portions of said one of said pair of strips situated to opposite sides of said region to move within said common plane relative to each other, and means for causing said portions of said one of said pair of strips to move within said common plane relative to each other and to thereby close said gap, said last mentioned means including means for establishing a magnetic flux through said pair of strips and across said spaced edges thereof.

41. An electric switching device comprising a pair of strips of magnetizable material in sheet-form arranged in a common plane, one of said pair of strips including a region between the ends thereof of sufficiently reduced cross-section and sufficient length to allow relative movement of the ends of said one of said pair of strips within said common plane, terminal means adjacent one of the ends of said one of said pair of strips for connecting said one of said pair of strips into an electric circuit, electric contact means arranged in said common plane adjacent the other of the ends of said one of said pair of strips normally spaced from said one of said pair of strips and adapted to be cooperatively engaged by an edge of said one of said pair of strips to close an electric circuit, and means for causing said edge of said one of said pair of strips to move within said common plane into engagement with said contact means, said last mentioned means including means for establishing a magnetic flux through said pair of strips.

42. An electric switching device as specified in claim 41 wherein the width of said region of reduced cross-section is generally of the same order as the thickness of said magnetizable material in sheet-form.

References Cited in the file of this patent

UNITED STATES PATENTS

| | | |
|---|---|---|
| 2,120,421 | Wagar | June 14, 1938 |
| 2,877,315 | Oliver | Mar. 10, 1959 |
| 2,922,855 | Ducati | Jan. 26, 1960 |